United States Patent [19]
Bollmer et al.

[11] 4,191,076
[45] Mar. 4, 1980

[54] ROTARY ANVIL CONSTRUCTION

[75] Inventors: Jacob A. Bollmer; Joseph E. Stearns, both of Dayton, Ohio; Alvin R. Brooks, Jr., Waynesville, N.C.

[73] Assignee: Dayco Corporation, Dayton, Ohio

[21] Appl. No.: 954,063

[22] Filed: Oct. 23, 1978

[51] Int. Cl.² ............................................. B26D 7/20
[52] U.S. Cl. .................................... 83/13; 83/347; 83/659; 83/698; 29/118; 24/201 C
[58] Field of Search ................ 83/13, 347, 659, 698; 101/415.1; 29/118, 129; 24/201 C

[56] References Cited
U.S. PATENT DOCUMENTS

| | | | |
|---|---|---|---|
| 3,739,675 | 6/1973 | Duckett et al. | 83/659 |
| 3,880,037 | 4/1975 | Duckett et al. | 83/659 |
| 3,882,750 | 5/1975 | Duckett et al. | 83/659 |

*Primary Examiner*—J. M. Meister
*Attorney, Agent, or Firm*—Reuben Wolk

[57] ABSTRACT

A rotary anvil construction, method of locking a die-cutting mat on such construction, and locking wedge for use with such construction and method are provided wherein the locking wedge is an immobile wedge and has locking surfaces which are adapted to have cooperating locking surfaces on flanges of a die-cutting mat of the rotary anvil construction snap-locked thereagainst.

20 Claims, 5 Drawing Figures

ROTARY ANVIL CONSTRUCTION

BACKGROUND OF THE INVENTION

1. Field of the Invention

This invention relates to a rotary anvil construction and method and in particular to an improved immobile locking wedge used with the construction and method.

2. Prior Art Statement

It is known to provide a locking wedge for locking a pair of flanges extending from opposite ends of a die-cutting mat in position within an associated groove provided within a rotary anvil and wherein such groove receives the flanges so that the wedge may be suitably moved to perform its locking function.

For example, see the following United States Patents to Duckett et al:

(1) U.S. Pat. No. 3,739,675
(2) U.S. Pat. No. 3,880,037
(3) U.S. Pat. No. 3,882,750

It appears that the locking wedge of item (1) is inserted axially within cooperating grooves in the flanges of a die-cutting mat after the mat is installed in position on a rotary anvil and such wedge is inserted in position with a special tool.

It appears that in item (2) a T-shaped clamping bar is detachably fastened in position after L-shaped end portions of a die-cutting mat are installed within a longitudinal groove of a rotary anvil.

It appears from item (3) that a comparatively complex rotatable wedge construction is provided which is rotated to one position to facilitate installation of flanges of a die-cutting mat within an associated groove in a rotary anvil and once the flanges are in position the anvil is rotated ninety degrees with a special tool to provide a locking action.

SUMMARY

It is a feature of this invention to provide a locking wedge for a rotary anvil construction which is immobile relative to its rotary anvil and is disposed within a groove of such rotary anvil wherein such locking wedge is particularly adapted to have portions of a die-cutting mat of the construction snap-locked thereagainst to fasten the mat on the rotary anvil.

Another feature of this invention is to provide a locking wedge of the character mentioned which has fixed locking surfaces adapted to be engaged by cooperating locking surfaces on flanges of the die-cutting mat.

Another feature of this invention is to provide a locking wedge of the character mentioned which has a pair of integral fixed guide surfaces with each guide surface being adapted to guide an associated flange of a die-cutting mat for snap-lock engagement of its cooperating locking surface against a locking surface of the locking wedge.

Another feature of this invention is to provide a locking wedge of the character mentioned which is provided as a part of an insert which is adapted to be fixed in position in a cutout of a rotary anvil and with such insert having cooperating surfaces defining a longitudinal groove in the anvil for receiving flanges of a die-cutting mat therewithin.

Another feature of this invention is to provide an improved locking wedge of the character mentioned which lends itself to modification of existing rotary anvils to include the invention therein.

Another feature of this invention is to provide an improved method of locking a die-cutting mat in a rotary anvil employing a locking wedge of this invention.

Therefore, it is an object of this invention to provide an improved rotary anvil construction, improved locking wedge for a rotary anvil construction, and improved method of snap-locking a die-cutting mat on a rotary anvil having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
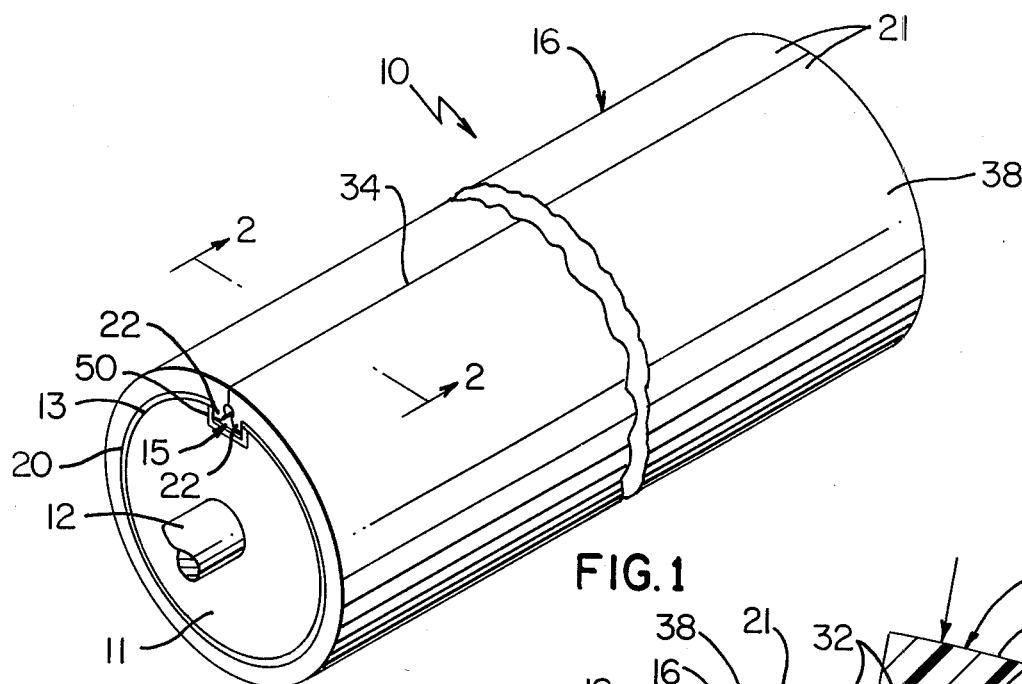
FIG. 1 is a perspective view with the central portion broken away of one exemplary embodiment of a rotary anvil construction of this invention.

Reference is now made to FIG. 1 of the drawing which illustrates an exemplary embodiment of a rotary anvil construction of this invention which is designated generally by the reference numeral 10. The anvil construction 10 is particularly adapted to be used with an associated cutter such as a rotary cutter or cylinder (not shown) having cutting devices in the form of blades, or the like, thereon and the rotary anvil construction 10 serves as a backup anvil allowing the blades of such rotary cutter to be urged against a workpiece to be cut to enable cutting of the workpiece such as a paper or plastic sheet, for example, without jagged edges and without damaging the blades.

Figure 2:
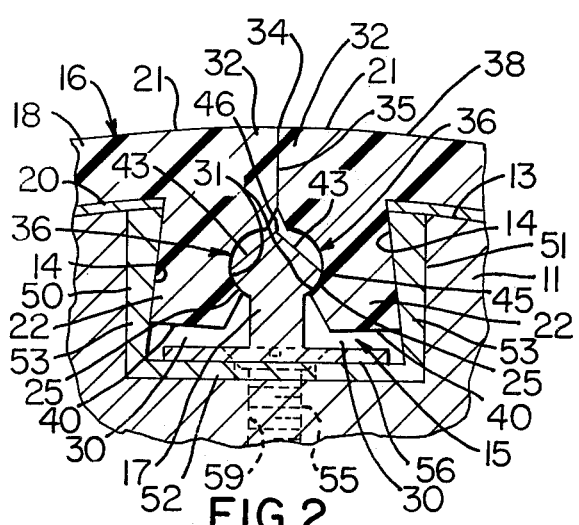
FIG. 2 is an enlarged cross-sectional view taken essentially on the line 2—2 of FIG. 1.
Figure 3:
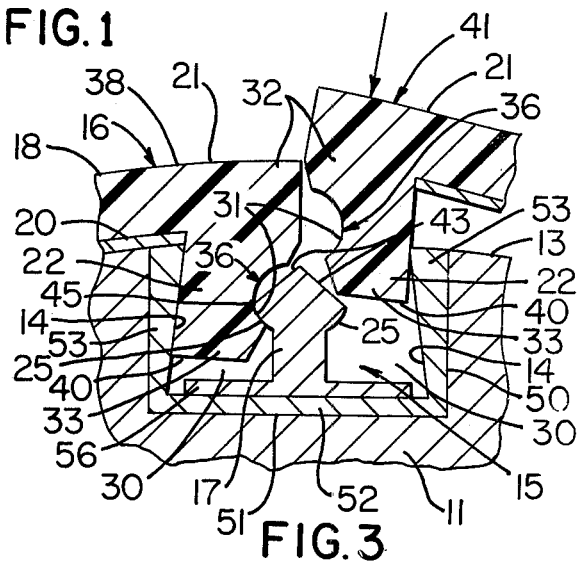
FIG. 3 is a view similar to FIG. 2 illustrating the method of this invention of wrapping a die-cutting mat around the rotary anvil of the construction and snap-locking the flanges of such die-cutting mat in position employing an improved locking wedge of this invention.

The rotary anvil construction 10 comprises a rotary anvil 11 having a pair of shaft portions 12 extending from opposite ends thereof which are particularly adapted to support the rotary anvil 11 and the entire construction 10 for rotation on associated support bearings and as is known in the art. As best shown in FIGS. 2 and 3, the rotary anvil 11 also comprises a right circular cylindrical outside surface 13 and a pair of holding surfaces each designated by the same reference numeral 14 extending inwardly from the outside surface 13. The surfaces 14 define opposed walls of a longitudinal groove in the rotary anvil 11 which is designated generally by the reference numeral 15.

The rotary anvil construction 10 also has a diecutting mat which is designated generally by the reference numeral 16 and such mat is wrapped around and against the surface 13 of such anvil and locked in position with an improved locking wedge 17 of this invention and as will be described in detail subsequently. In particular, the diecutting mat 16 comprises a main body portion 18 which is provided with a suitable substrate structure or backing material which is designated generally by the reference numeral 20 and presented in the drawing by general cross hatching symbol. The backing material may be any suitable material employed in the art for this purpose such as a woven or nonwoven plastic fabric, for example. The die-cutting mat 16 is preferably made of a compressible resilient elastomeric material such as a synthetic plastic material, for example, and such mat has end portions 21 on opposite sides of its main body portion 18 which terminate in a pair of locking flanges each designated by the same reference numeral 22.

The locking flanges 22 of the mat 16 are particularly adapted to be received within the longitudinal groove 15 of the rotary anvil 11 and the previously mentioned locking wedge 17 which also comprises the construction of this invention and is utilized in carrying out the method of this invention, is also provided within the groove 15, as will now be explained, and serves to lock the flanges 22 in position on the rotary anvil 11 and thereby lock the die-cutting mat 16 against the outside cylindrical surface 13 of such anvil.

As best seen in FIG. 3 of the drawing, the locking wedge 17 is an immobile wedge in that it is fixed in a stationary position relative to rotary anvil 11 and die-cutting mat 16. Further, with the wedge 17 installed in groove 15, all components thereof always remain in their same positions including during locking of the mat flanges 22 in position.

Figure 4:
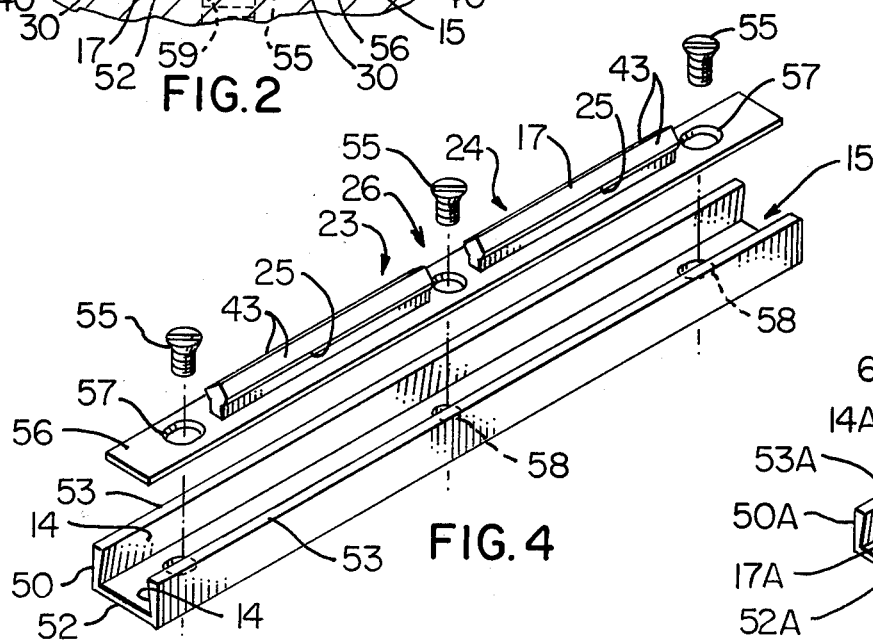
FIG. 4 is an exploded perspective view particularly illustrating the exemplary embodiment of the locking wedge of FIGS. 1–3 disposed over an associated U-shaped insert and illustrating threaded screws employed to fasten the insert and locking wedge in position.

The locking wedge 17 of this example of the invention is shown in FIG. 4 in two identical portions at 23 and 24 separated by a central cutout portion 26 and this is achieved in order to enable fastening the central part of the locking wedge 17 in position within its groove 15. However, it will be appreciated that the wedge 17 may be defined as a continuous member without the cutout portion 26, if desired. Further, the following detailed description is fully applicable to wedge 17 whether made in one piece or a plurality of pieces.

The locking wedge 17 has what will be referred to as a fixed locking surface 25 on each side thereof and each locking surface 25 is spaced from an associated one of the holding surfaces 14 to define a flange-receiving channel 30 therebetween. Each of the flanges 22 of the die cutting mat 16 has a cooperating locking surface 31 which cooperates with as associated locking surface 25 to lock the mat 16 against the rotary anvil 11 as will be explained in detail.

Each of the flanges 22 has an inner portion 32 adjoining the mat, i.e., the main part of an associated terminal portion 21 of mat 16; and, each flange 22 has an outer portion 33. Each outer portion 33 is adapted to be yieldingly compressed within an associated channel such that a cooperating locking surface 31 on each flange 22 is snap-locked against an associated locking surface 25 of the wedge 17 once the associated terminal end portion 33 is yieldingly compressed within its associated channel 30. As best seen in FIG. 2, as the cooperating surfaces 31 of flanges 22 are snap-locked within their channels 30 and against their locking surfaces 25, the inner portions 32 of the flanges 22 are moved firmly against each other to define a firm line contact 34 therebetween at the outer right circular cylindrical surface 38 of the die-cutting mat 16. Further, the flanges 22 and die cutting mat 16 are constructed such that a planar substantially rectangular interface 35 is provided at the location where the inner portions 32 of the flanges 22 abut each other with the flanges 22 snap-locked in position.

As will be readily apparent from FIGS. 2 and 3 of the drawing each of the locking surfaces 25 is an arcuate surface shown in this example as a substantially cylindrical surface which extends through an angular arc of less than ninety degrees. Further, each of the cooperating locking surfaces 31 is a cooperating arcuate surface 31 which preferably comprises a fractional part of an overall roughly semicylindrical surface which is designated generally by the reference numeral 36. Each overall semicylindrical surface 36 is defined by a corresponding semicylindrical cutout in the flange 22. The fractional surface portion or cooperating locking surface 31 is more adjacent the terminal outer surface 40 of the outer end portion 33 than it is to the portion of flange 22 shown at 41 which comprises a part of a right circular cylindrical outside surface 38 of the die-cutting mat 16.

As will be readily apparent from FIGS. 2 and 3 of the drawing the locking wedge 17 has a fixed guide surface on each side thereof and each guide surface is designated by the same reference numeral 43. Each guide surface 43 serves to guide its flange 22 toward an associated channel 30. Each guide surface 43 is a planar surface and has an outermost edge and an inner edge with the inner edges ajoining an associated holding surface along its entire outer edge as shown at 45 while the outermost edges of the guide surfaces 43 adjoin on a line designated by the same reference numeral 46 to define a roughly V-shaped surface.

Referring again to FIG. 4, it is seen that the locking wedge 17 comprises a part of a roughly U-shaped insert 50 of the construction 10 and the U-shaped insert 50 is fixed within a cutout 5 in the rotary anvil 11. The insert 50 has a bight 52 and a pair of legs 53 extending perpendicularly from opposite ends of the bight 52 with the legs having surfaces facing toward each other which define the holding surfaces 14 once the insert 50 is fixed in position within the cutout 51 in the rotary anvil and as shown in FIGS. 2 and 3.

The locking wedge 17 is fixed to the bight 52 and extends therefrom midway between surfaces 14. In this example of the invention the locking wedge 24 is fixed against the bight 52 by a plurality of threaded screws 55 which not only serve to hold the locking wedge 24 in position but also serve to fix the U-shaped insert 50 in position within the cutout 51 in anvil 11.

To facilitate installation of the locking wedge 17 of this invention within groove 15 of the rotary anvil 11 the locking wedge 17 has a base portion 56 which is a flat strip-like portion and the wedge 17 and the flat strip-like portion 56 has countersunk holes 57 defined therein which are particularly adapted to be aligned with cooperating holes 58 of the U-shaped insert 50 and threaded openings 59 in the rotary anvil 11 for fixing the two part wedge 17, defined by portions 23 and 24, in position within the groove 15. As mentioned earlier the wedge 17 has a central cutout 26 and such cutout facilitates the provision of countersunk hole 57 therein for insertion of an associated threaded screw 55 to thereby enable fastening the locking wedge and U-shaped insert 50 in position on the rotary anvil 11 with three screws 55 along the axial length of such anvil. However, in those applications where the cutout 26 is not provided fastening screws 55 may be provided at only opposite ends of the wedge 17.

The locking wedge 17 need not necessarily be used in association with a U-shaped insert such as the insert 50, indeed in some applications of this invention the cutout 51 is defined in the rotary anvil 11 such that the holding surfaces 14 are provided in the main part of the anvil itself. In both of these situations the surfaces 14 converge radially; and, in this latter instance the wedge 17 would be merely fastening in position by fastening the base 52 thereof within the groove 15 utilizing the threaded screws 55 and threading such screws within associated aligned threaded openings 59.

Figure 5:
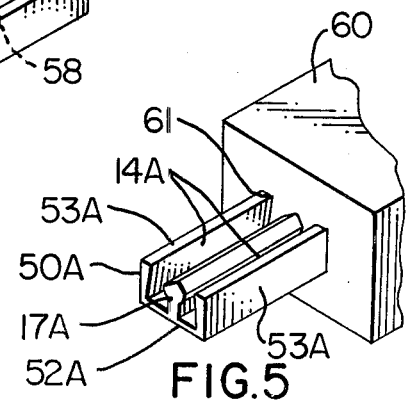
FIG. 5 is a fragmentary perspective view illustrating another exemplary embodiment of the locking wedge of this invention and a method step which may be employed in making same.

Another exemplary embodiment of the locking wedge of this invention is illustrated in FIG. 5 of the drawing. The locking wedge of FIG. 5 is very similar to the locking wedge 17; therefore, such locking wedge will be designated by the reference numeral 17A and representative parts of such locking wedge which are similar to corresponding parts of the locking wedge 17 will be designated in the drawings by the same reference numerals as in the locking wedge 17 followed by an associated letter designation A and not described in detail.

The main difference between the locking wedge 17A and the locking wedge 17 is that the locking wedge 17A is defined as a single-piece structure with an associated U-shaped insert which is designated by the reference numeral 50A to correspond to the insert 50. Further, component portions of insert 50A will be designated by the same reference numerals as corresponding portions of insert 50 also followed by the reference numeral A.

The locking wedge 17A is defined so that it extends from the bight 52A and midway between legs 53A of its insert 50A to define what may be considered a structure of E-shaped end or cross-sectional configuration. The E-shaped single-piece structure has holding surfaces 14A defined as the walls thereof which face the wedge portion 17A and is particularly adapted to be used interchangeably with the basically two piece structure of FIG. 4.

One technique for fastening the E-shaped structure of FIG. 5 within a cutout 51 of the rotary anvil 11 would be to provide countersunk openings therein which are similar to and at the same positions that openings 57 are provided after cutting away portions of the locking wedge above bight 52A similar to cutout 26 to enable easy drilling of the countersunk holes therein for alignment over threaded openings 59 in the rotary anvil 11. Thus, the E-shaped one piece structure of FIG. 5 is completely interchangeable with the two piece structure of FIG. 4.

The E-shaped structure with its locking wedge 17A and U-shaped insert 50A defined as a single-piece may be defined employing any suitable technique known in the art. Preferably such structure is defined by extrusion process employing an extrusion apparatus 60 having an extrusion opening 61 therein which defines the detailed configuration of the E-shape.

However, regardless of whether the locking wedge is provided as an integral part of a U-shaped insert, fastened to a U-shaped insert, or fastened within a cutout 51 of a rotary anvil, the basic concept of this invention still applies. Namely, such concept utilizes fixed and immobile locking surfaces on a locking wedge which are particularly adapted to have cooperating locking surfaces of flanges of a die-cutting mat snap-locked thereagainst in a simple manner heretofore unknown in this art. Further, the locking surfaces on the locking wedge are used in cooperation with associated guide surfaces on such locking wedge in accordance with the teachings of this invention.

Each of the rotary anvil 11, U-shaped insert 50, and locking wedge 17 may be made utilizing any suitable material and manufactured in accordance with any suitable technique known in the art. Further, the single-piece E-shaped structure may be made of either a metallic or nonmetallic material such as synthetic plastic.

It will also be appreciated that the die-cutting mat of this invention may be made of any suitable elastomeric material which is used with a rotary cutter and which is capable of being yieldingly compressed yet has the abovedescribed character of resiliency which provides a self-locking or snap action whereby once each flange 22 is urged within its channel 30 portion 33 of such flange beneath surface 36 is compressed as it is urged past common edge 45 of surfaces 25 and 43 and once the bottom edge of cooperating locking surface 31 moves past edge 45 the flange snap locks in position. Many polymers are capable of being yieldingly compressed and provide a resilient snap action, such as, polyurethanes and natural or synthetic rubber compounds, for example.

The locking wedge of this invention has been described as an immobile wedge and it should be emphasized that this refers to the fact that once such wedge is made part of the construction the wedge and all its components are fixed and immobile relative to the rotary anvil at all times both before and after installing the die cutting mat in position.

While present exemplary embodiments of this invention, and methods of practicing the same, have been illustrated and described, it will be recognized that this invention may be otherwise variously embodied and practiced within the scope of the following claims.

We claim:

1. In a rotary anvil construction comprising; a rotary anvil having an outer substantially cylindrical surface and having a pair of spaced holding surfaces extending radially inwardly from said cylindrical surface and defining opposed walls of a longitudinal groove in said anvil; a die-cutting mat attached against said anvil and having opposite end portions terminating in a pair of identical locking flanges extending from said end portions and being received within said groove; and a wedge for locking said flanges against said holding surfaces; the improvement wherein said wedge is an immobile locking wedge disposed within said groove and having fixed locking surface on each side thereof, each locking surface being spaced from an associated one of said holding surfaces to define a flange-receiving channel therebetween, and each of said flanges has an inner portion adjoining said mat and an outer portion adapted to be yieldingly compressed within an associated channel, each other portion having a cooperating locking surface which is snap-locked against an associated locking surface of said wedge to lock its flange in position once the associated outer end portion is yieldingly compressed within its associated channel.

2. In a construction as set forth in claim 1 the further improvement in which each of said locking surfaces is an arcuate surface and each of said cooperating surfaces is a cooperating arcuate surface.

3. In a construction as set forth in claim 2 the further improvement in which each of said locking surfaces is a substantially cylindrical surface which extends through an angular arc of less than ninety degrees.

4. In a construction as set forth in claim 3 the further improvement in which each of said cooperating locking surfaces comprises a fractional portion of a roughly semicylindrical surface defined by a corresponding semicylindrical cutout in its flange, said fractional portion of said roughly semicylindrical surface being closely adjacent the terminal outer surface of said outer end portion.

5. In a construction as set forth in claim 1 the further improvement wherein said locking wedge has afixed guide surface on each side thereof which serves to guide its flange toward an associated channel.

6. In a construction as set forth in claim 5 the further improvement in which each of said locking surfaces has an upper rectilinear edge disposed parallel to a longitudinal axis of said rotary anvil and each of said guide surfaces is a planar surface having an outermost edge and an inner edge, each of said inner edges adjoining an associated upper rectilinear edge of a locking surface.

7. In a construction as set forth in claim 6 the further improvement in which said outermost edges of said guide surfaces adjoin so that said guide surfaces define a roughly V-shaped surface.

8. In a construction as set forth in claim 1 the further improvement in which said locking wedge comprises a roughly U-shaped insert fixed within a cutout in said rotary anvil, said insert having a bight and a pair of legs extending from opposite edges of said bight, said legs having surfaces facing toward each other which define said holding surfaces, said locking wedge being fixed to said bight.

9. In a construction as set forth in claim 8 the further improvement in which said locking wedge is fixed to said bight as an integral part thereof by defining said insert with its legs, bight, and wedge as a single-piece structure.

10. In a construction as set forth in claim 7 the further improvement in which said locking wedge comprises a roughly U-shaped insert fixed within a cutout in said rotary anvil, said insert having a bight and pair of legs extending from opposite ends of said bight, said legs having surfaces facing toward each other which define said holding surfaces, said locking wedge being fixed to said bight.

11. In a construction as set forth in claim 10 the further improvement in which each of said flanges is made as an integral part of said mat.

12. In a construction as set forth in claim 11 the further improvement in which each of said flanges has the outer surface of its terminal end portion disposed in spaced relation above said bight with the flange locked in position, said spaced relation enabling insertion of a tool between each flange and bight for easy removal of the flange and mat from around said rotary anvil.

13. In a locking wedge for a rotary anvil construction comprising a rotary anvil having an outer substantially cylindrical surface and having a pair of spaced holding surfaces extending radially inwardly from said cylindrical surface and defining opposed walls of a longitudinal groove in said anvil; a die-cutting mat attached against said anvil and having opposed end portions terminating in a pair of identical locking flanges extending from said end portions and being received within said groove; said wedge locking said flanges against said holding surfaces; the improvement wherein said wedge is an immobile locking wedge disposed within said groove and having fixed locking surface on each side thereof, each locking surface being spaced from an associated one of said holding surfaces to define a flange-receiving channel therebetween, each of said flanges having an inner portion adjoining said mat and an outer portion adapted to be yieldingly compressed within an associated channel, each other portion having a cooperating locking surface which is adapted to be snap-locked against an associated locking surface of said wedge to lock its flange in position once the associated outer end portion is yieldingly compressed within its associated channel.

14. In a locking wedge as set forth in claim 13 the further improvement in which each of said locking surfaces is an arcuate surface which is adapted to be engaged by an associated cooperating locking surface also in the form of an arcuate surface.

15. In a locking wedge as set forth in claim 14 the further improvement in which said wedge has a fixed guide surface on each side thereof which serves to guide its flange toward an associated channel.

16. In a locking wedge as set forth in claim 15 the further improvement in which said outermost edges of said guide surfaces adjoin so that said guide surfaces define a roughly V-shaped surface.

17. In a method of locking a die-cutting mat to a rotary anvil which has an outer substantially cylindrical surface and a pair of spaced holding surfaces extending radially inwardly from said cylindrical surface and defining opposed walls of a longitudinal groove in said anvil and wherein said die-cutting mat has opposite end portions terminating in identical locking flanges extending from said end portions and being received within said groove, the improvement comprising the steps of, fixing an immobile locking wedge within said groove, said locking wedge having a fixed locking surface on each side thereof and each locking surface being spaced from an associated one of said holding surfaces to define a flange-receiving channel therebetween, forming a cooperating locking surface on each of said flanges so that each of said flanges has an inner portion adjoining said mat and an outer portion adapted to be yieldingly compressed within an associated channel, and snap-locking each cooperating locking surface against an associated locking surface of said wedge by yieldingly compressing the associated terminal end portion of each flange within an associated channel.

18. In a method as set forth in claim 17 the further improvement comprising the step of defining said locking surfaces of said locking wedge as arcuate surfaces prior to said fixing step.

19. In a method as set forth in claim 18 the further improvement wherein said forming step comprises forming said cooperating locking surfaces as arcuate surfaces.

20. In a method as set forth in claim 17 the further improvement wherein said snap-locking step comprises said yieldingly compressing by urging each flange radially inwardly toward the center of said anvil.

* * * * *